Patented July 26, 1949

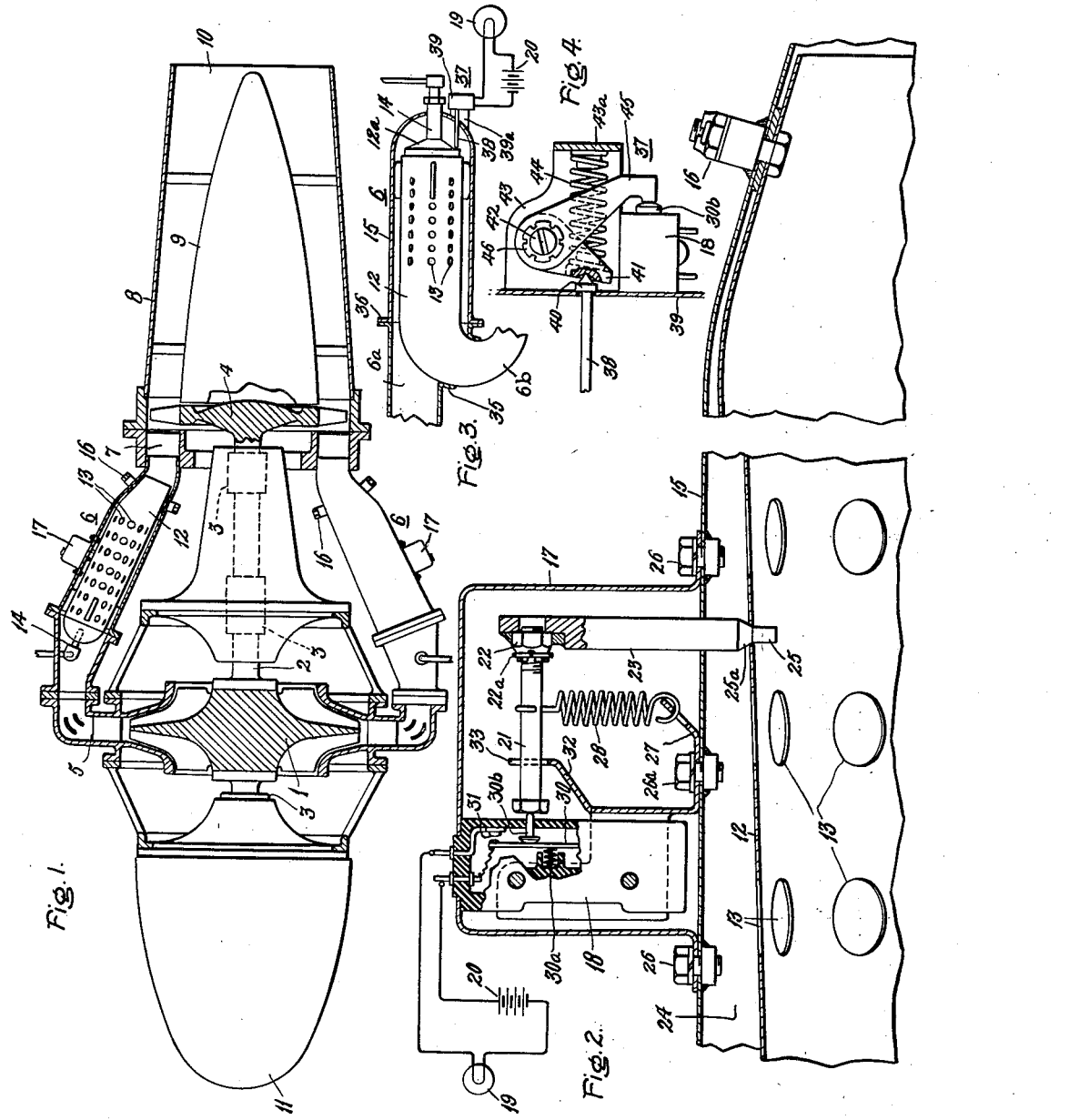

2,476,998

UNITED STATES PATENT OFFICE 2,476,998

HEAT GENERATION INDICATOR

Hugh M. Ogle, Schenectady, N. Y., assignor to General Electric Company, a corporation of New York Application May 29, 1946, Serial No. 673,043

9 Claims. (Cl. 177—311)

My invention relates to a device for detecting the occurrence of heat generation, or the presence of flame in a combustion device, particularly to an arrangement for producing a signal indicating that heat generation or combustion has ceased in such a device.

While not limited thereto, the invention is particularly adapted for use in connection with gas turbine combustors, such as those used in turbine power plants for the propulsion of aircraft. In such aircraft power plants, a plurality of combustion chambers are sometimes used, supplying hot gas to a common turbine. It may happen, particularly at extremely high altitudes and under certain abnormal operating conditions, that one or more of the combustion chambers "blow-out". Ordinarily, one or a few of the combustors will blow out before the others do. It is of importance to the pilot to know when this happens so that remedial steps can be taken promptly before combustion ceases in all the combustors.

An object of the invention is to provide an improved arrangement for indicating the presence or absence of heat generation in a heat-generating or combustion device.

A further object is to provide an indicator for signaling the cessation of combustion, or "blow-out", in a combustor for a gas turbine power plant.

A still further object is to provide an improved heat generation signaling device which is extremely simple yet efficient, quick, and reliable in operation.

Other objects and advantages will be apparent from the following description taken in connection with the accompanying drawings, in which Fig. 1 is a diagrammatic representation of an aircraft jet propulsion gas turbine power plant incorporating the invention; Fig. 2 is an enlarged sectional view showing a preferred form of construction for the combustion indicator and its application to the combustor; Fig. 3 is a diagrammatic representation of an alternative form of the invention, indicating the relation of the signaling device to the combustor; and Fig. 4 is an enlarged detail view of the signaling device of Fig. 3.

Referring now to Fig. 1, the invention is disclosed as applied to an aircraft jet engine comprising a centrifugal compressor 1 mounted on a shaft 2 which is supported in suitable bearings 3 and carries, in over-hung relation, a single-stage axial flow turbine bucket-wheel 4. Air discharged from the compressor impeller 1 passes through a vane-type diffuser 5 to one or more combustors indicated generally at 6, thence to a nozzle 7, which directs motive fluid onto the buckets of wheel 4. Motive fluid exhausted from the turbine is discharged through concentric casings 8 and 9, the former of which defines a suitable propulsion nozzle 10. Accessories for the power plant, such as an electric generator, starter motor, fuel pumps, and other components may be housed in the nose section 11 and arranged to be driven from an extension of the turbine-compressor shaft 2. Such a jet engine is more fully disclosed in application Serial No. 525,391, filed March 7, 1944, in the name of Dale D. Streid, now Patent No. 2,432,359.

Each combustor 6 consists of a substantially cylindrical inner liner 12 provided with axially and circumferentially spaced perforations 13 through which air from compressor 1 enters the combustion space defined within the liner 12. A suitable fuel spray is produced by a nozzle 14 located at one end of the combustor. A combustor of this type is more fully disclosed in an application, Serial No. 750,015 filed May 23, 1947, in the name of Anthony J. Nerad.

As may be more clearly seen in Fig. 2, the inner liner 12 is affixed to the outer housing 15 by one or more suitable threaded fastenings 16 located near the turbine nozzle end of the combustor.

During operation, air is supplied from diffuser 5 to the annular chamber 24 defined between combustor housing 15 and the inner liner 12, from whence it flows through perforations 13 into the combustion space defined within the inner liner, where it mixes with fuel from nozzle 14, and the mixture burns. While, for large compressor pressure ratios, the temperature of the air supplied to chamber 24 may be rather high, for instance in the neighborhood of 400 to 500 degrees, Fahrenheit, it is materially lower than that obtaining when combustion is taking place inside liner 12. Therefore, it will be readily apparent that the liner 12 will be much hotter than the outer housing 15 as long as combustion takes place. Since both are fabricated of a suitable stainless steel in thin sheet form, having an appreciable linear coefficient of thermal expansion, there will be considerable differential expansion between housing 15 and liner 12 when combustion occurs. My invention makes use of this differential thermal expansion to initiate a signal which may be used to indicate the presence or absence of combustion.

In the preferred modification shown in Fig. 2, my combustion indicator consists of a housing 17 secured to the outer surface of combustor casing 15 and containing an electric switch 18 arranged to complete a circuit through a signal light 19 energized from a suitable source of current 20. It will be understood, of course, that there may be one indicator and a corresponding signal light 19 for each combustor, in those power plants having more than one combustor.

Switch 18 has an actuating member 30 engaged by a slidable pin 30b, which is in turn engaged by one end of a rod 21 arranged substantially parallel to the outer surface of casing 15. The end of rod 21 remote from the switch 18 is threaded for engagement with a castellated nut 22 secured, as by welding, to a lever 23. Lever 23 may advantageously be in the form of a round rod projecting through a hole drilled in the outer casing 15 and snugly fitting said hole. The lower end of lever 23 projects through the air plenum chamber 24 and has a reduced end portion 25 entering, with little or no clearance therebetween, a hole drilled in the wall of inner liner 12. A tapered portion 25a may be provided connecting the main portion of lever 23 with the reduced end portion 25, so that any "lost motion" between portion 25 and the hole in liner 12 will be taken up automatically.

Housing 17 may be secured to combustor casing 15 by one or more suitable threaded fastenings 26. Fastening 26a secures a bracket 27 having a hole through which is hooked one end of a coil spring 28. The other end of spring 28 is hooked around rod 21, as clearly shown in Fig. 2. A function of spring 28 is to firmly bias actuating lever 23 inwardly so that the reduced end portion 25, 25a engages the hole in liner 12 with no lost motion therebetween. A second bracket 32 is formed integral with, or secured to, bracket 27, and has a bifurcated end portion 33 which serves as a guide for rod 21 to prevent transverse displacement of rod 21 relative to button 30b. The operation of this form of the invention is as follows. As long as air from compressor 1 flows to plenum chamber 24, through perforations 13, and out through nozzle 7, with no combustion taking place, the inner liner 12 and outer casing 15 will be maintained at substantially the same temperature, namely, that of the combustion air from the compressor discharge. In an actual installation, casing 15 may run slightly cooler than liner 12 by reason of certain radiation and convection losses from the outer surface of casing 15. Thus, when the power plant starts and before combustion takes place, there will be some slight differential thermal expansion between members 12 and 15. The switch 18 and the switch actuating rod 21 are adjusted relative to each other, by rotating the rod 21 in nut 22 and then locking by means of cotter pin 22a, so that this initial differential thermal expansion, due merely to combustion air flowing through the combustor, will not cause switch 18 to energize signal light 19. The arrangement can thus be readily adjusted so that switch 18 will not be actuated by the combustion air temperature.

When combustion takes place, the temperature of inner liner 12 is very rapidly increased to a differential of the order of 300 degrees Fahrenheit, or more, above that of the outer casing 15. The resultant very appreciable differential thermal expansion causes inner liner 12 to move to the left (Fig. 2) relative to casing 15, which movement causes lever 23 to be deflected in a clockwise direction, thus moving rod 21 to the right and permitting switch actuating members 30, 30b to move, under the influence of biasing spring 30a, to close contacts 31 and thereby energize the circuit to the signal light 19.

As the temperature differential between members 12 and 15 increases above the critical value required to close contacts 31, lever 23 will be deflected clockwise still further, with the result that the left-hand end of rod 21 will move entirely away from engagement with switch actuator 30. It will be apparent that for all temperature differentials above the critical value, the contacts 31 will remain closed and the lamp 19 lighted, and that such increasing differentials will not impose any correspondingly increasing stresses on the switch 18.

When combustion inside liner 12 ceases, the compressor discharge air quickly cools inner liner 12 causing it to contract and move lever 23 counterclockwise. This movement causes the end of rod 21 to engage member 30b and open the contacts 31, causing telltale light 19 to be extinguished. It will be understood that even if there is only one combustor 6, or if combustion in all combustors should stop simultaneously, the inertia of the rotor 1, 2, 4 will be sufficient to continue for some interval of time the supply of air to plenum chamber 24 so as to produce the cooling action required to promptly actuate the blow-out indicator.

An alternate modification of the invention is shown in Fig. 3 as applied to a combustor 6 receiving air through a conduit 6a from the compressor and discharging hot gases through a conduit 6b to the turbine. As will be apparent from Fig. 3, the inner liner 12 is held in fixed relation to the outer housing 15 by reason of the engagement of a flanged casing portion 35 with the discharge portion 6b of the inner liner. To permit assembly and disassembly of the combustor for servicing the inner liner, the outer housing 15 may be made detachable from the air inlet adapter 6a at the flanged connection 36. Any suitable means (not shown) may be employed for clamping the flanged joint 36 together. The fuel spray nozzle 14 is secured to the end dome 12a and is arranged to slide freely through an opening in the right-hand end of the outer housing 15.

The combustion indicator, shown generally at 37 in Fig. 3, is secured on the end dome of the outer housing 15 by any suitable support means, as for instance a welded bracket 39a. An actuating rod 38 projects through the outer end dome, in freely slidable relation therewith, and has a portion engaging the outer surface of the inner end dome 12a. It will be apparent that under the influence of the extremely hot products of combustion within, liner 12 will expand to the right with respect to outer housing 15, and thereby cause the signal actuating rod 38 to be moved to the right.

Fig. 4 represents to an enlarged scale the details of the signal controlling device 37. The actuating rod 38 projects, in freely slidable relation, through an opening in the housing 39 and has an end member 40 arranged to engage an arm 41 pivotally carried on a bolt 42 secured to a suitable supporting bracket 43. A biasing spring 44 engages a projecting end portion 43a of the bracket 43 and is arranged to bias arm 41 to the left into engagement with the actuating rod end member 40.

Also arranged for pivotal movement about the bolt 42 is a second lever arm 45 having an end portion adapted to engage the actuating button 30b of switch 18. Arranged between the head of the bolt 42 and the outside surface of arm 45 is a resilient washer 46 arranged to bias the adjacent portions of levers 45 and 41 into frictional engagement with each other. This comprises a well-known type of friction coupling arrangement, and further details are believed not material to an understanding of the present invention. The construction of the switch 18 may be similar to that indicated in Fig. 2, although of course many other suitable types of switches may be used.

The operation of the modification of Figs. 3 and 4 is quite similar to that of the preferred modification shown in Figs. 1 and 2. As long as hot air from the compressor is flowing through the combustor, with no combustion taking place inside liner 12, the differential thermal expansion between liner 12 and housing 15 is insufficient to move lever 45 away from the switch actuating button 30b and cause the contacts to close to energize the signal light 19. However when combustion takes place, the inner liner 12 expands considerably to the right relative to outer housing 15, causing rod 38 to move lever 41 counterclockwise, the friction coupling between lever 41 and lever 45 causing the latter to also move counterclockwise, permitting button 30b to move to the right and cause energization of the signal lamp 19. Likewise when combustion ceases, the inner liner rapidly cools, causing rod 38 to move to the left, levers 41 and 45 to rotate clockwise, and the button 30b to be engaged to break the circuit to the signal lamp.

It should be observed that excessive expansion of the inner liner 12 may cause the levers 41, 45 to rotate counterclockwise to such a degree that the free end of lever 45 will engage the transversely extending portion 43a of the supporting bracket. If then rod 38 should move still further to the right, the lever 45 will be prevented from moving further by this engagement with bracket portion 43a, but the lever 41 may continue to rotate counterclockwise by reason of the above-described friction coupling arrangement between the levers 41, 45. After such abnormal motion of the rod 38 occurs, movement to the left will again cause lever 45 to engage the switch actuating button 30b so as to operate the signal light in the intended manner. The friction coupling between levers 41, 45 is arranged to be sufficiently "firm" that there will be no relative motion between the two lever portions except when the actuating rod 38 moves an excessive amount so as to rotate lever portion 41 to a degree greater than the corresponding movement which portion 45 can describe before engaging the bracket portion 43a.

Once the mechanism has been moved through an unusual displacement so as to cause slippage of the friction coupling, the coupling will thereafter hold the lever portions 41, 45 in their new position relative to each other. Thus it will be seen that this modification automatically "recalibrates" itself in the event of abnormal movement of the actuating rod 38. This arrangement also facilitates the initial assembly of the device, since the space relation between the end portion 12a of the inner liner, the actuating rod 38, the lever portions 41, 45 and the switch actuating button 30b need not be adjusted with great precision. The first time the arrangement is used, the very considerable differential expansion of the inner liner 12 will cause end dome 12a to engage actuating rod 38, and if movement of rod 38 to the right is sufficiently great, the friction coupling will permit lever portions 41, 45 to shift relative to each other to the degree required.

In its broadest aspects my invention constitutes an indicating or signaling arrangement for detecting the presence of a heat generating reaction, in which one member is arranged to be subjected to direct transfer of heat from the space or medium in which the heat generation occurs, while a second member is arranged to be subjected to less direct transfer of heat, so that the occurrence of heat generation may be detected by sensing the temperature differential between the two members. In the specific forms disclosed herein, the invention comprises a first member arranged to receive heat directly from hot products of combustion, while another member is arranged to be maintained substantially at the temperature of a reaction-supporting fluid medium supplied to the reaction space.

While my invention is believed to be generally applicable to heat generating devices, it was specifically intended for, and has been found to be particularly useful in connection with, hot gas generators for thermal power plants such as those used in gas turbine power plants for aircraft propulsion. It will be observed that the indicating devices used are extremely simple and so arranged that they may be readily applied to the combustors of an existing thermal power plant simply by drilling a few holes in the housing and liner of the combustor. Combustion indicators embodying my invention have been found to be quick-acting and reliable under a wide variety of operating conditions.

What I claim as new and desire to secure by Letters Patent of the United States, is:

1. In a device for indicating the presence of a heat generating reaction in a combustor having an inner liner adapted to be subjected to hot reaction products during operation and an outer casing spaced from the inner liner to define therewith a reactant fluid plenum chamber, the combination of fastening means securing the inner and outer combustor members together, and lever means engaging said inner and outer combustor members at a location spaced from the fastening means and positioned by differential thermal expansion of the combustion members for indicating the presence of hot reaction products within the inner liner.

2. In a device for indicating the presence of a heat generating reaction in apparatus including an inner liner forming a reaction space and subjected to direct transfer of heat from the reaction products during operation and an outer casing spaced from the inner liner to define therewith a reactant fluid inlet chamber, the combination of means securing said inner and outer members together, and a signalling member having an end portion engaging the inner liner at a location spaced from said securing means, an intermediate portion projecting through and engaging the outer casing, and a second end portion arranged to signal the presence of a heat-generating reaction within the inner liner, said signalling member being positioned by the differential thermal expansion of the inner liner and the outer casing between the signalling member and the securing means.

3. In a device for signalling the presence of a heat generating reaction in a combustion device having a combustion chamber and means for supplying air under pressure thereto, the combination of a first member having a portion subjected directly to heat from the products of combustion during operation, a second member maintained substantially at the temperature of a combustion-supporting fluid supplied to the chamber, means securing said members together, and a member positioned in accordance with differential thermal expansion of said first and second members from said securing means for signaling the presence of a heat liberating reaction within the chamber.

4. In a signalling device for indicating the presence of a heat generating reaction in a combustion device having a combustion chamber and compressor means for supplying air thereto, the combination of a first member having a portion subjected directly to heat from the products of combustion during operation, a second member maintained substantially at the temperature of the combustion air supplied to said chamber, means fastening said first and second members together, and lever means located in spaced relation to said securing means and having spaced portions engaging the first and second members respectively so as to be moved when the first member expands and contracts relative to the comparatively cooler second member during release of heat within the combustion chamber.

5. In a signalling apparatus for indicating the presence of a heat-generating reaction in a heat generation device having a combustion chamber and means for supplying a combustion-supporting fluid thereto under pressure the combination of a first member having a portion subjected directly to heat from the combustion process during operation, a second member maintained at substantially the temperature of the combustion-supporting fluid supplied to the chamber, means securing said members in fixed relation to each other at one location, and a member spaced from said fastening means and engaging said members so as to be positioned by differential thermal expansion therebetween for indicating the presence of combustion in the chamber.

6. In apparatus for indicating the presence of a heat-releasing reaction in a heat generation device having a reaction space and means for supplying a reactant fluid thereto under pressure, the combination of first means receiving heat directly from the heat-generating medium during operation, second means maintained at substantially the temperature of the fluid supplied to said space, and means responsive to the temperature differential between said first and second means for signaling the occurrence of a heat generating reaction in said space.

7. In apparatus for indicating the presence of a heat-releasing reaction in a heat generation device having a chamber and compressor means for supplying air thereto at superambient pressures, the combination of a first member having a portion subjected directly to heat from the products of combustion during operation, a second member maintained at substantially the temperature of the compressed air supplied to the combustion space, and means responsive to differential thermal expansion between said first and second members for indicating the presence of combustion in said space.

8. In apparatus for indicating the occurrence of a heat releasing reaction in a heat-generating device having an inner liner defining a reaction space and subjected to direct transfer of heat from the reaction during operation and an outer casing spaced from the inner liner to define therewith a reactant fluid inlet chamber, and means securing the inner liner and outer casing in fixed relation to each other at one location, the combination of an actuating member spaced from said securing means and having an end portion engaging the inner liner, an intermediate portion projecting slidably through the outer casing and a second end portion adapted to actuate an indicating device, said device including a first pivoted lever, means biasing said first lever into engagement with the actuating member so as to be positioned thereby, a second lever pivoted about the same axis as the first lever and adapted to actuate a signaling device, stop means for limiting the movement of the second lever, and friction coupling means connecting said first and second levers whereby the first may continue to move after the second is in engagement with said stop means in order that over-travel of the first lever will be permitted without imposing excessive forces on the signalling device.

9. In signalling apparatus for indicating the presence of a heat-releasing reaction in a combustion device having walls defining a reaction space for effecting combustion at pressures substantially above that of the ambient atmosphere and means for supplying air thereto at pressures above the combustion space pressure, the combination of a first heat expandible member subjected directly to heat from the products of combustion during operation, a second heat expandible member maintained substantially at the temperature of the compressed combustion supporting air, means securing said members in fixed relation to each other at one location, and means responsive to differential thermal expansion of said members from said securing means and adapted to signal the presence of a heat generating reaction within the chamber.

HUGH M. OGLE.

REFERENCES CITED

The following references are of record in the file of this patent:

UNITED STATES PATENTS

| Number | Name | Date |
|---|---|---|
| 1,054,845 | Hodges | Mar. 4, 1913 |
| 1,107,316 | Kuhn et al. | Aug. 18, 1914 |
| 1,190,204 | Storey | July 4, 1916 |
| 1,246,656 | Potter | Nov. 13, 1917 |
| 1,941,310 | Lines | Dec. 26, 1933 |
| 1,980,836 | Timm et al. | Nov. 13, 1934 |
| 2,408,667 | Martin | Oct. 1, 1946 |

FOREIGN PATENTS

| Number | Country | Date |
|---|---|---|
| 122,202 | Switzerland | Dec. 1, 1927 |